(12) United States Patent  
Balaev (10) Patent No.: US 12,234,170 B2  
(45) Date of Patent: Feb. 25, 2025

(54) METHOD OF PURIFYING NATURAL WATER AND WASTEWATER

(71) Applicant: Igor Malykhin Moro, Benalmadena (ES)

(72) Inventor: Igor Semenovich Balaev, Moscow (RU)

(73) Assignee: Igor Malykhin Moro, Benalmadena (ES)

( * ) Notice: Subject to any disclaimer, the term of this patent is extended or adjusted under 35 U.S.C. 154(b) by 683 days.

(21) Appl. No.: 17/310,472

(22) PCT Filed: Jul. 31, 2019

(86) PCT No.: PCT/RU2019/000536  
§ 371 (c)(1),  
(2) Date: Aug. 5, 2021

(87) PCT Pub. No.: WO2020/222670  
PCT Pub. Date: Nov. 5, 2020

(65) Prior Publication Data  
US 2022/0127175 A1    Apr. 28, 2022

(30) Foreign Application Priority Data  
Apr. 29, 2019 (RU) .......................... RU2019113558

(51) Int. Cl.  
*C02F 9/00* (2023.01)  
*B01D 24/18* (2006.01)  
(Continued)

(52) U.S. Cl.  
CPC .............. *C02F 9/00* (2013.01); *B01D 24/186* (2013.01); *B01D 24/4631* (2013.01);  
(Continued)

(58) Field of Classification Search  
None  
See application file for complete search history.

(56) References Cited

U.S. PATENT DOCUMENTS

| | | |
|---|---|---|
| 4,885,083 A | 12/1989 | Banks |
| 7,270,745 B2 | 9/2007 | Schwartzkopf |

FOREIGN PATENT DOCUMENTS

| | | |
|---|---|---|
| DE | 1960008 A1 | 4/1971 |
| RU | 2112579 C1 | 6/1998 |

(Continued)

OTHER PUBLICATIONS

Balaev, I.S. et al., "Opyt i perspektivy vnedreniya dinamicheskikh osvetliteley pri ochistke prirodnykh i stochnykh vod," Vodoochistka, Vodopodgotovka, Vodosnabzhenie, 2014, JNo3 (75), p. 38-48, p. 39-44, Fig. 2-3 [Experience and prospects for the introduction of dynamic clarifiers in the treatment of natural and waste water].

(Continued)

*Primary Examiner* — Peter Keyworth  
(74) *Attorney, Agent, or Firm* — Aird & McBurney LP

(57) ABSTRACT

The invention is classified as a physicochemical method of natural and waste water treatment and can be used in the energy engineering, chemical, petrochemical, food and other industries, especially in treatment of process, domestic, precipitation, mining, oilfield, quarry water and the water of tailing pounds.

The purpose of the invention is to improve the treatment of natural and waste water, to increase the capacity of a moving bed pressure filter and also to ensure high efficiency of the cleaning of the moving bed.

The technical result is the expansion of the range of application of the moving bed pressure filter ensuring high efficiency of treatment of both low-contaminated natural water and highly contaminated waste water.

(Continued)

This result is obtained due to the use of additional stages of chemical treatment during water treatment (oxidizing agent, demulsifier, powder sorbent), the use of various types of a pressure flocculation reactor, grains for a single and double moving bed, which have different grain composition and density, the performance of four-stage cleaning of the moving bed, the use of a dual-flow moving bed pressure filter, as well as due to the use of the additional pressure flocculation reactor followed by the removal of severe contamination with the use of a pressurized hydrocyclone.

14 Claims, 7 Drawing Sheets

(51) Int. Cl.
| | |
|---|---|
| *B01D 24/46* | (2006.01) |
| *B01D 39/04* | (2006.01) |
| *C02F 1/00* | (2023.01) |
| *C02F 1/28* | (2023.01) |
| *C02F 1/38* | (2023.01) |
| *C02F 1/50* | (2023.01) |
| *C02F 1/52* | (2023.01) |
| *C02F 1/76* | (2023.01) |
| *C02F 101/32* | (2006.01) |
| *C02F 103/00* | (2006.01) |
| *C02F 103/10* | (2006.01) |
| *C02F 103/36* | (2006.01) |

(52) U.S. Cl.
CPC ...... *B01D 39/04* (2013.01); *B01D 2239/1241* (2013.01); *B01D 2239/1291* (2013.01); *C02F 1/001* (2013.01); *C02F 1/283* (2013.01); *C02F 1/38* (2013.01); *C02F 1/50* (2013.01); *C02F 1/5245* (2013.01); *C02F 1/5281* (2013.01); *C02F 1/76* (2013.01); *C02F 2101/32* (2013.01); *C02F 2103/007* (2013.01); *C02F 2103/10* (2013.01); *C02F 2103/365* (2013.01); *C02F 2209/40* (2013.01); *C02F 2303/16* (2013.01)

(56) References Cited

FOREIGN PATENT DOCUMENTS

| | | |
|---|---|---|
| RU | 87421 U1 | 10/2009 |
| RU | 105185 U1 | 6/2011 |

OTHER PUBLICATIONS

Posobie Po Proektirovaniu Sooruzhenii Dlia Ochistki I Podgotovki Vody , 1989, Moscow, pp. 65-69 [Water Treatment Plant Design Handbook, 1989, pp. 65-69].

International Search Report (and English translation thereof) of PCT/RU2019/000536 mailed Jan. 30, 2020.

International Preliminary Report on Patentability (and English translation thereof) of PCT/RU2019/000536 mailed Nov. 2, 2021.

METHOD OF PURIFYING NATURAL WATER AND WASTEWATER

The invention is classified as a physicochemical method of natural and waste water treatment and can be used in the energy engineering, chemical, petrochemical, food and other industries, especially in treatment of process, domestic, precipitation, mining, oilfield, quarry water and water of tailing pounds.

There are pressure and gravity filters with an expanded polystyrene moving bed. The pressure filter has a cylindrical body with upper and lower distribution devices, midrange drainage and pipelines with shutoff valves for supply and drainage of flows. The filtering of the feedwater and flushing of the bed with the feedwater is performed in downflows. The bed expands by 20-30% during flushing (see Water Treatment Plant Design Handbook SNiP 2.04.02-84, 1989, p. 65-69).

The disadvantages of these filters are low-grade treatment of the feedwater, since they are designed for clarification of surface water without chemicals, therefore this equipment is mainly used in the preliminary stage of water treatment. Moreover, the flow rate of water flush is a significant part in comparison with the volume of treated water.

There is a method of regeneration of the filter moving bed and a device for its implementation (see Patent RU 2112579 dated Feb. 18, 1997), which includes a filter body with the moving bed, pipelines for supply of raw water and drainage of the treated water, valves and drainage and distribution devices. The feedwater is filtered in the upflow through the moving bed, and regular cleaning of the moving bed is performed in the downflow of the water flush. To increase the efficiency of the cleaning of the moving bed from contaminants, a vacuum effect is provided.

The disadvantage of this invention is also low-grade nonchemical treatment of the feedwater and the vacuum effect produces less significant effect in certain complex operations during the treatment of the moving bed.

There is a single-chamber filter (see U.S. Pat. No. 4,885,083 dated Dec. 5, 1989) with a filter body including upper and lower drainage and distribution devices, in which moving bed grains with a density of 0.7-0.9 $g/cm^3$ are located. The feedwater is treated in the upflow through the moving bed without chemicals. To clean the moving bed, pulsed and compressed air and water flush are supplied in the downflow.

The disadvantage of this device is also low-grade nonchemical treatment of the feedwater.

There is a moving bed filter (see U.S. Pat. No. 7,270,745 dated Sep. 18, 2007) consisting of one or two moving bed pressure filters, spherical grains with a grain size from 0.5 to 1 mm and a low density from 0.05 to 0.3 $g/cm^3$, which are made of plastics, foamed glass or ceramics. The feedwater is treated in the upflow through the moving bed without chemicals. The regular cleaning of the moving bed is performed by drain out of the pressure filter and flushing with water through special nozzles until the filter is completely filled with the water.

The disadvantages of this device are also low-grade nonchemical treatment of the feedwater, the fragility of the grains of the moving bed, which are made of foamed glass or ceramics.

There is a double-bed pressure filter for extensive water treatment (see Utility Patent RU 105185 dated Jun. 1, 2009), one body of which has at least one group of chambers for filter materials with different properties, bed expansion chamber for back flushing, screen nozzle drainage systems for supply of the feedwater, filtrate and water flush drainage system, whereby the group of chambers for the filter materials with different properties consists of the upper chamber, which contains a filter bed representing an expanded polystyrene moving bed and a lower chamber containing a filter bed made of sorption material heavier than water, whereby the bed expansion chamber for back flushing is located between the upper and lower chambers of the group for filter materials with different properties.

The disadvantage of the filter is a low capacity of the filter, since the filtration through the moving bed is performed in the downflow, which results in expansion of the bed, penetration of contaminants to the lower chamber and filtration through the sorption granular bed, which is contaminated and therefore should be replaced.

The nearest equivalent technical solution, a prototype, is a water treatment plant (see the article "Experience of the Implementation of Dynamic Clarifiers for the Treatment of Natural and Waste Water"/Water Supply and Sanitary Engineering, No. 12, 2013, p. 46-53), which includes the following treatment stages: mixing of the feedwater with a coagulant, flocculation in the pressurized tank for 5-10 minutes in the downflow, mixing of the feedwater with a flocculant, filtration in the upflow through the moving bed with a grain size of 3-5 mm and a density of 0.8-0.9 $g/cm^3$ in the pressure clarifier, final treatment in case of filtering through a double granular bed and disinfection of the treated water with sodium hypochlorite.

This plant ensures high quality of the treated water due to preliminary chemical treatment of the feedwater. At the same time, the experience of the implementation of this technology is indicative of a number of disadvantages:

1. The moving bed with the grains 3-5 mm of size is quickly contaminated in the process of treatment of the feedwater, which results in frequent cleaning of it from the contaminants. The moving bed is cleaned with compressed air and then with water in the opposite direction, which does not provide a high degree of cleaning of the moving bed. At the same time, this cleaning results in the damage of the upper distribution device of the pressure clarifier.
2. In case of treatment of the feedwater at a temperature below 10° C., the flocculation within 5-10 minutes in the downflow in the pressurized tank is not effective due to slack in time for the flocculation, which results in reduction in the effectiveness of the feedwater treatment.
3. This plant is also not effective for treatment of the feedwater containing light contamination with a density lower than the density of water that is petroleum hydrocarbons and oils.
4. One of the disadvantages is also a limited capacity of the plant.

The technical result, at which this invention aimed, is the expansion of the range of application of the moving bed pressure filter ensuring high efficiency of treatment of both low-contaminated natural water and highly contaminated waste water.

The objectives of the claimed invention is:
improvement of the water treatment efficiency,
increased intensification of the process,
development of an effective method for cleaning of the moving bed from contaminants kept back,
selection of materials of the moving bed and performance attributes of its grains, providing long run life of the moving bed,
increase of the contaminant capacity of the moving bed pressure filter, that is the increase in the volume and quantity of the contaminants kept back in the feedwater between regular cleanings of the moving bed, selection of the optimal height of the moving bed, reducing the cost of chemicals for the treatment of treated water.

The set objectives are attained by the reason that an oxidizer for destruction of organic contaminants and a coagulant are added successively to the feedwater. Then the feedwater flows under pressure to the intermediate pressure for flocculation, the volume of which should ensure keeping of the feedwater in it within 2-30 minutes for generation of micro flocks of the contaminants. The time of keeping of the feedwater in the flocculation reactor depends on the temperature and the contamination of the feedwater. If the temperature of the feedwater is below 10° C., the time of its keeping in the flocculation reactor is 10-30 minutes, the time is 2-10 minutes at a temperature above 10° C. There is provided an absolutely new approach to the equipment of the pressure flocculation reactor. Three modifications of this equipment are offered.

The pressure flocculation reactor in the first and second cases, is a vertical pressure vessel with upper and lower distribution devices, to ensure a uniform flow of the feedwater. If a temperature of the feedwater is above over 10° C., it is suggested that the feedwater flows downward through the flocculation reactor, since the flocculation is the most effectively at this temperature.

In the second case, if the temperature of the feedwater is below 10° C. and in case of treatment of low turbid and deep color water, it is suggested that the feedwater flows upward. This solution will increase the flocculation effect, since the flocculation process slows down at low temperatures. In case of the upflow, the effect of the flocculation ability increase will be created by micro flocks, which were generated before and which will be suspended, which will make it possible to reduce the consumption of the coagulant as compared with the first modification.

There is provided to supply the feedwater to the middle of the vertical flocculation reactor in the third case. This solution will be optimal for the treatment of feedwater containing light fraction contaminants with a density less than the density of water that is petroleum hydrocarbons and oils. In this case, the flocculation reactor is a vertical pressure vessel, which has upper, middle and lower distribution devices. After the feedwater is treated with chemicals, that is oxidizing agents and a coagulant, it is supplied to the middle distribution device. Then the feedwater flows downward to the lower distribution device. The light contaminants such as petroleum hydrocarbons with a density lower than the density of water, separate and go up from the middle distribution device to the top of the flocculation reactor. There is provided to remove the light contaminants through the upper distribution device continuously or regularly as they are accumulated in the top part of the flocculation reactor.

To improve the efficiency of the separation of the light contaminants from the feedwater, there is provided to add a demulsifier to the feedwater before the treatment in the flocculation reactor.

Then a flocculant is added to the feedwater after the treatment in the flocculation reactor, in order the micro flocks aggregate. In case of the intensive contamination of the feedwater with petroleum hydrocarbons or other organic substances, there is also also provided to add aqueous solution of a powder sorbent that is powdered activated carbon or other sorbent before adding of the flocculant to the feedwater. The feedwater flows to the moving bed pressure filter after adding of the last chemicals and is filtered in the upflow through the moving bed, to the grains of which the micro flocks of the contaminants stick due to the aggregation effect by with the use of the flocculant.

In case of use of the aqueous solution of powdered activated carbon or another sorbent, the micro particles of the latter also stick to the surface of the grains of the moving bed, which results in forming of a film on the surfaces of the grains of the moving bed, providing sorption capability to remove organic compounds and petroleum hydrocarbons from the feedwater.

Since the moving bed is in the pressure filter, which has upper and lower distribution devices with known slotted devices preventing removal of the moving bed grains from the filter, and the feedwater is treated in the upflow, so the moving bed will be in a clamped-up state consequently providing a high degree of the treatment of the feedwater due to the numerous pore contact between the bed grains and micro flocks of the contaminants and their aggregation due to the flocculant on the surface of the moving bed grains.

The tray-plate type upper and lower distribution devices or collector and radial type upper and lower distribution devices with slotted devices of known designs are used.

In case of the treatment of the feedwater, the moving bed accumulates contaminants, which cement the moving bed (the clogging effect), and so creates a certain resistance during filtration of the feedwater and, as a result, the filtration decreases. Therefore, regular cleaning of the moving bed in the pressure filter is required and it is traditionally performed by a downflow of the water. Actually, such a cleaning of the moving bed is not effective. It is also impossible to clean the moving bed with the upflow of compressed air, since the moving bed is in a clamped-up state.

The objective of development of the effective method for cleaning of the moving bed from the contaminants kept back is attained by the fact that a partial emptying of the pressure filter is performed to the intent that the moving bed goes down and is located in the middle of the pressure filter and provides a distance between the lower boundary of the moving bed and the lower distribution device more than 10 cm, as well as the distance between the upper boundary of the moving bed and the upper distribution device is also more than 10 cm. This requirement is provided by the fact that in case of the next cleaning of the moving bed due to the supply of compressed air in the upflow at smaller distances, damage to the upper and lower distribution devices due to the random motion of the grains of the moving bed in the water layer is possible. And only after the partial emptying of the pressure filter has been completed and when the moving bed is no longer in the clamped-up state, the compressed air is supplied through the lower distribution device under pressure of 2-10 bar for 3-30 minutes, the upflow of which destroys the "cementation" (clogging) of the moving bed and at the same time, the moving bed grains move randomly in the water layer and rub together, providing, on the other hand, an intensive cleaning of the surfaces of the moving bed grains from the stuck contaminants. 20-30 minutes are required under the compressed air pressure of 2 bar and 3-10 minutes are enough under the pressure of 10 bar.

The next step is to fill the pressure filter with water either by the upward or downflow of the water, during which step the moving bed goes up and fills the top of the pressure filter.

After the pressure filter is filled with the water, the water flush is supplied in the downward direction, which washes the moving bed grains and ensures removal of all the contaminants with the density heavier than that of water. Therefore, flushing with water by the downflow lasts for a short time that is from 2 to 20 minutes, consequently reducing the volume of the water flush. The linear velocity of the water flush is 15-40 m/h (4-11 l/s*m$^2$). If the water flush is supplied with the velocity of 15 m/h, 15-20 minutes are required, 2-7 minutes are enough in case of the velocity of 40 m/h. The water flush is removed from the pressure filter through a lower distribution device with known slotted devices preventing the removal of the moving bed grains from the filter, but which allow the contaminants with the water flush to penetrate.

To increase the intensification of the water treatment process, namely, the capacity of the moving bed filter, there is provided the development of a new method for filtration of the feedwater through the moving bed. This method is as follows. After the feedwater passes the stage of treatment with chemicals, namely an oxidizing agent, coagulant and flocculant and after it passes through the pressure flocculation reactor, the feedwater is supplied to the moving bed pressure filter in two directions that is upward and downward and, respectively, the feedwater is filtered through the moving bed grains by downflow and upflow. The feedwater is drained through the additional middle distribution device with known slotted devices located in the middle of the moving bed. This solution ensures two-fold increase of the capacity of the moving bed filter. At the same time, after the water treatment cycle is completed and if the moving bed is completely contaminated (the clogging effect) and the filtration of the feedwater decreases, it is necessary to clean the moving bed.

This procedure is performed as follows. First, partial emptying of the moving bed pressure filter is performed by drainage of the water through the lower distribution device so that the moving bed goes down and is located in the middle between the lower distribution device and the additional middle distribution device. The distance between the bottom moving bed and the lower distribution device should be more than 10 cm, and the distance between the top moving bed and the additional middle distribution device should also be more than 10 cm. This requirement is provided by the fact that in case of the next cleaning of the moving bed due to the supply of compressed air by the upward flow at smaller distances, the damage to the lower and middle distribution devices due to the random motion of the moving bed grains in the water layer.

Then the partial emptying is stopped and the compressed air under pressure from 2 to 10 bar is supplied to the lower distribution device of the moving bed pressure filter for 3-30 minutes, the upflow of which destroys the "cementation" (clogging) of the moving bed and ensures the random motion of the moving bed grains in the water layer, which results in the effect of friction of the grains, consequently providing the intensive cleaning of the contaminants stuck to the surface of the moving bed grains.

The next step is to fill the pressure filter with water either by the upward or downflow of the water, during which step the moving bed goes up and fills the top of the pressure filter.

After the pressure filter is filled with the water, the water flush is supplied in the downward direction, which washes the contaminants, which come unstuck, from the surface of the moving bed grains and ensures the removal of them from the pressure filter. Since the contaminants have a density heavier than that of water, the removal of such contaminants requires less water flush and shorter time of flushing with the water, which is 2-20 minutes. The linear velocity of the water flush is 15-40 m/h (4-11 l/s*m$^2$). Thus, a low volume of the water flush is provided compared to the volume of the treated water. The water flush is removed from the pressure filter through a lower distribution device with known slotted devices preventing the removal of the moving bed grains from the filter, but which allow the contaminants with the water flush to penetrate.

The proposed method of cleaning of the moving bed with the compressed air, ensures, on the one hand, highly effective cleaning of the surfaces of the moving bed grains from contaminants, but, on the other hand, is the cause of destruction of the moving bed grains.

The set objective of choosing materials for moving bed grains providing long run life of the moving bed in the pressure filter, is attained by the fact that polymer materials with a grain density from 0.3 to 0.98 g/cm$^3$, that is a density less than the density of water. To use the grains with the density less than 0.3 g/cm$^3$ is inadvisable because of their high porosity and consequently, their irreversible compressibility and poor strength, which does not guarantee their durability. To use the grains with the density more than 0.98 g/cm$^3$ is inadvisable because of the risk of their gravitation to the bottom of the pressure filter, which consequently reduces the efficiency of treatment of the feedwater.

Experience of use of the materials as a moving bed based on the expanded polystyrene and roll or other equivalent materials with a density of grains less than 0.3 g/cm$^3$ is indicative of the fact that these materials are effective for water treatment only without preliminary treatment of the water with coagulants and flocculants. In case of the chemical treatment (coagulant, flocculant), these materials are irreversibly compressed and destroyed in the process of filtering of the feedwater in the upflow in the pressure filter due to sticking of the grains of the contaminants to the surface, which reduces their life sharply.

The bases consisting of polyethylene of high and low pressure, polypropylene, various composite materials and their equivalents including the degree of their expansion, are proposed as basic materials, in order to provide the required density of the moving bed grains.

Use of the moving bed grains with pores on their surfaces or with large inclusions results in filling of these pores with the contaminants during the filtration process of the feedwater and weighting of the bed, which, consequently results in transfer of the moving bed to a heavy bed, that is gravitation of the grains to the bottom of the pressure filter and loss of efficiency of the feedwater treatment. In this regard, the problem of selection of the shape of the moving bed grains is very actual. Therefore, there is provided to use the grains with a smooth surface or with small inclusions with the total volume of the latter not more than the last 10% of the grain volume. The shape of the grains can be different that is spherical, hemispherical, cylindrical, and others.

The problems of increase of the contaminant capacity of the moving bed of the pressure filter that is increase of the volume and quantity of the contaminants of the feedwater kept back between regular cleanings of the moving bed is solved as follows.

In case of use of the single bed, that is when the grains with the same density are used, use the grains with the size range 3-10 mm. In this case, a greater amount of the contaminants of the feedwater is kept back due to the larger pore size between the grains of the moving bed, than in case of use of the grains of 3-5 mm in size.

The second solution for the increase of the contaminant capacity of the moving bed and simultaneous ensuring of high-grade treatment of the feedwater is the use of the double moving bed in the pressure filter.

There is provided to use the grains with low density in the range of 0.3-0.8 g/cm$^3$ and grains with a smaller size range 1-5 mm as a top moving bed. The grains with a heavier density in the range of 0.8-0.98 g/cm$^3$ and with a larger grain size of 3-20 mm are proposed for use as the bottom moving bed.

In case of the upflow of filtering of the feedwater, the use of the double moving bed will enable keeping back of the greater amount of the contaminants in the bottom large grain moving bed, and the top small grain bed will ensure keeping back of all the contaminants of the feedwater.

In case of the treatment of the moving bed according to the claimed method, the double bed will be mixed and cleaned during cleaning of it with compressed air, and in case of flushing of the moving bed with the water downflow, the succession in the beds will be provided due to the different grain density of the top and bottom moving bed.

The height of the moving bed will depend on the degree of contamination of the feedwater, the diameter of the pressure filter and the rate of the filtering of the feedwater through the moving bed. Therefore, the height of the bed will be from 0.5 to 2.3 meters for a filter with a single moving bed with grain size of 3-10 mm. The total height of the bed will be from 1.0 to 2.5 meters for a pressure filter with a double moving bed, of which the top bed is from 0.3 to 1.5 meters high, and the bottom bed is from 0.5 to 1.5 meters. A total height of 1.0 to 3.5 meters should be taken for a double-flow moving bed pressure filter and the middle distribution device is located in the middle of this height.

To reduce the costs of chemicals for the treatment of the feedwater after it passes the pressure flocculation reactor and after the aqueous solution of powder sorbent and flocculant are added to the feedwater, the feedwater flows to the second stage flocculation reactor and then to the moving bed pressure filter.

The second stage pressure flocculation reactor is used in 3 modifications.

The pressure flocculation reactor in the first and second cases, is a vertical pressure vessel with upper and lower distribution devices, to ensure a uniform flow of the feedwater. If a temperature of the feedwater is above over 10° C., it is suggested that the feedwater flows downward through the flocculation reactor, since the flocculation is the most effective at this temperature.

In the second case, if the temperature of the feedwater is below 10° C. and in case of treatment of low turbid and deep color water, it is suggested that the feedwater flows upward. This solution will increase the flocculation effect, since the flocculation process slows down at low temperatures. In case of the upflow, the effect of the flocculation ability increase will be created by micro flocks, which were generated before and which will be suspended, which will make it possible to reduce the consumption of the coagulant as compared with the first modification.

There is provided to supply the feedwater to the middle of the vertical flocculation reactor in the third case. This solution will be optimal for the treatment of feedwater containing light fraction contaminants with a density less than the density of water that is petroleum hydrocarbons and oils. In this case, the flocculation reactor is a vertical pressure vessel, which has upper, middle and lower distribution devices.

The feedwater after treatment with chemicals, that is oxidizing agents and a coagulant, is supplied to the middle distribution device. Then the feedwater flows downward to the lower distribution device. The light contaminants such as petroleum hydrocarbons with a density lower than the density of water, separate and go up from the middle distribution device to the top of the flocculation reactor. There is provided to remove the light contaminants through the upper distribution device continuously or regularly as they are accumulated in the top part of the flocculation reactor. To improve the efficiency of the separation of the light contaminants from the feedwater, there is provided to add a demulsifier to the feedwater before the treatment in the flocculation reactor.

The difference of the second stage flocculation reactor is the shorter time of keeping of the feedwater in this second stage reactor, which is 1-10 minutes, depending on the degree of contamination of the feedwater and its temperature. If the temperature of the feedwater is less than 10° C., the time of its keeping in the second stage flocculation reactor is 5-10 minutes, and 1-5 minutes at a temperature above 10° C.

The use of the second stage flocculation reactor ensures high efficiency of forming of large-sized flocks of the contaminants in the feedwater due to preliminary adding of a flocculant and additional time of 1-10 minutes of keeping of the feedwater in this reactor consequently reducing the consumption of the chemicals (coagulant, flocculant).

It is further worthy of note that in case of high concentrations of heavy contaminants in the feedwater, the moving bed pressure filter is quickly contaminated and frequent cleanings of the moving bed are required resulting in sharp increase in the volume of the flushing waste water. Therefore, to ensure the treatment of feedwater containing intensive contamination (suspended solids with different dispersion, clay, sand, coal dust, etc.), after the feedwater passes the second stage pressure flocculation reactor, the feedwater with large-sized flocks of the contaminants flows to the pressurized hydrocyclone of known designs first and then to the moving bed pressure filter. This solution enables to remove heavy contaminants including coagulating heavy contaminants through the lower conical device of known types of the pressurized hydrocyclone resulting in sharp decrease in the amount of contaminants penetrating the moving bed pressure filter consequently resulting in extension of the time between cleaning of the moving bed.

Figure 1:
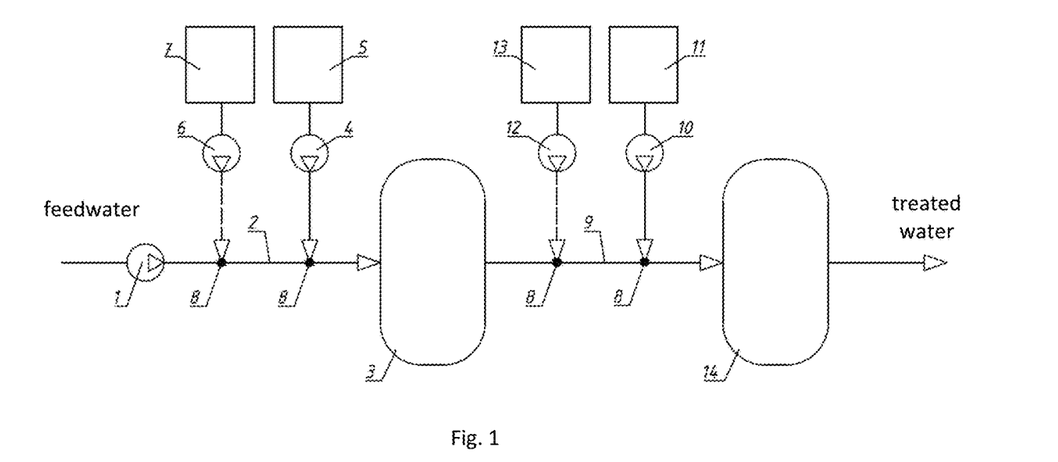
FIG. 1 shows an option of cleaning of the feedwater with the use of the pressure filter including a double-flow moving bed pressure filter (Option 1).

FIG. 1 shows an option of treatment of the feedwater with the use of the moving bed filter. Option 1.

The feedwater under pressure 2 to 16 bar is supplied from the pump 1 through the pipe 2 to the pressure flocculation reactor 3. The coagulant solution is added beforehand from respective tank 5 to pipeline 2 under pressure from coagulant pump 4. The difference of this plant is adding of the oxidizing solution to pipe 2, which is added by means of pump 6 from respective tank 7. Adding of the oxidizing solution before adding of the coagulant enables oxidizing and destruction of complex organic contaminants in the feedwater and increase in the effectiveness of flocculation. Known mixing devices 8 are installed in the pipeline 2 for better mixing of the feedwater and chemicals in the form of an oxidizing agent and a coagulant.

Figure 2:
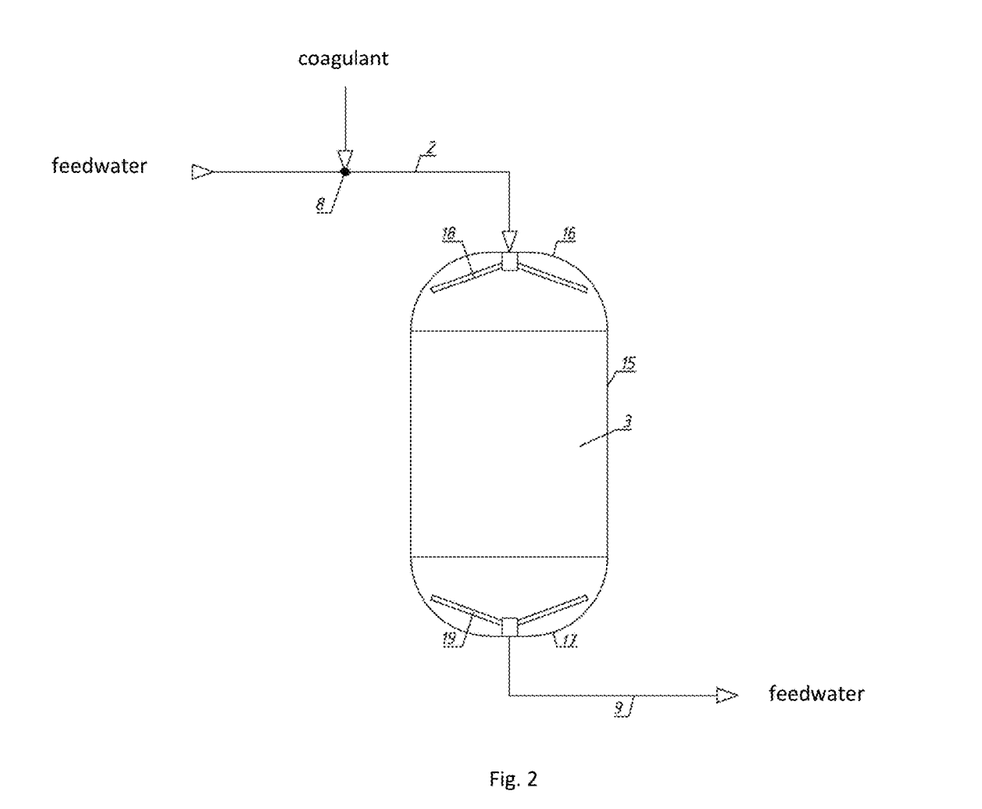
FIG. 2—Pressure flocculation reactor (Option 1).
Figure 3:
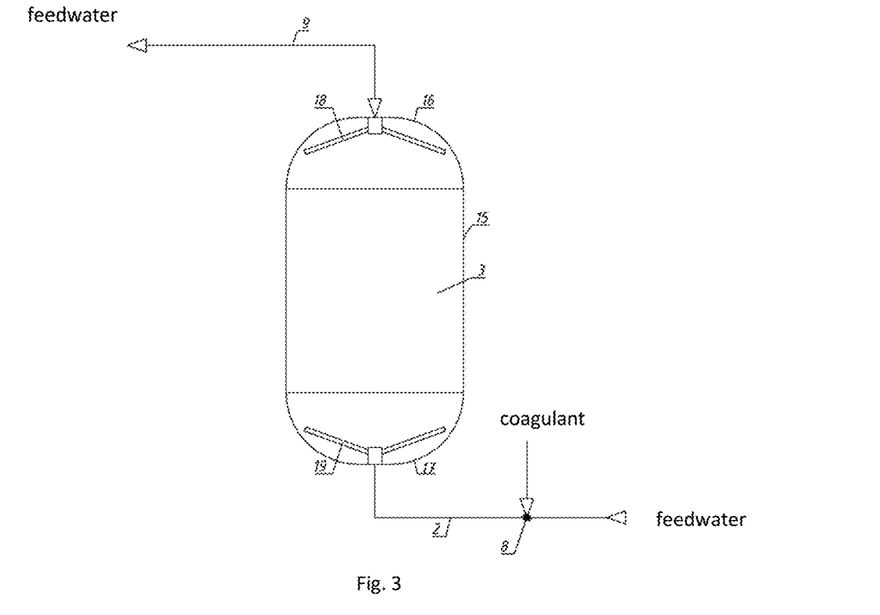
FIG. 3—Pressure flocculation reactor (Option 2).
Figure 4:
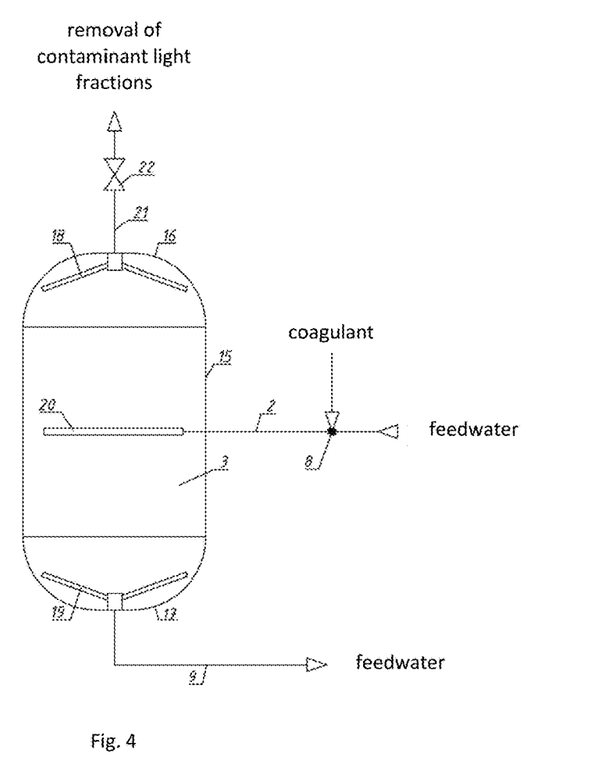
FIG. 4—Pressure flocculation reactor (Option 3).

Various options of the pressure flocculation reactor are showed in FIG. 2, FIG. 3 and FIG. 4.

In principle, the pressure flocculation reactor is a vessel, to which the feedwater flows after mixing with an oxidizing agent and a coagulant and in case of keeping in which, micro flocks of the contaminants are generated in the feedwater.

The volume of the pressure flocculation reactor should provide a certain time of keeping of the feedwater. The time is from 2 to 30 minutes, which depends on the temperature and contamination of the feedwater.

FIG. 2 shows a conventional (known) pressure flocculation reactor 3 (Option 1), which consists of a cylindrical vertical body 15 and, respectively, upper 16 and lower 17 spherical heads. There is an upper distribution device 18 in the upper sphere 16, which is connected to the pipeline 2 for supply of the feedwater to the pressure flocculation reactor.

There is a lower distribution device 19 in the lower sphere 17, which is connected to pipe 9 for removal of the feedwater from the pressure flocculation reactor.

The upper 18 and lower 19 distribution devices ensure a uniform downflow of the feedwater, and the internal volume of the reactor vessel ensures the duration of keeping of the feedwater in the pressure flocculation reactor, in order to form flocculated micro flocks of the contaminants in the feedwater.

At the same time, this design of the pressure flocculation reactor has several disadvantages.

Especially in case of cleaning of the feedwater at a temperature below 10° C., the flocculation process is impaired and the downflow of the feedwater with unformed micro flocks of the contaminants, which have a density greater than the density of water, pass the pressure flocculation reactor consequently resulting in loss of the efficiency of cleaning of the feedwater at the next stage of filtrating through the moving bed of the pressure filter.

Therefore, there is provided to change the flow direction of the feed water from downward to upward. The FIG. 3 shows the pressure flocculation reactor (Option 2) with the same devices as those showed in FIG. 2 with the only difference. The flow of the feedwater is supplied to the lower distribution device 19 of the pressure flocculation reactor 3 through pipe 2 and removed through upper distribution device 18 and then the water flows to the moving bed filter through pipe 9.

This solution enables increase of the flocculation effect due to previously formed micro flocks, which are suspended and will act as a catalyst for the flocculation process.

FIG. 4 shows the pressure flocculation reactor (Option 3), which is advised to use for treatment of the feedwater with light contaminants with a density lower than the density of water, especially the contaminants containing petroleum hydrocarbons and oils.

This device differs from the device showed in FIG. 2 and FIG. 3 by the fact that the feedwater is supplied to the pressure flocculation reactor 3 through additional middle distribution device 20 through pipeline 2 after mixing with chemicals, that is an oxidizing agent and a coagulant.

Device 20 makes it possible to separate light contaminants such as petroleum hydrocarbons and oils with a density less than the density of water from the feedwater, which contaminants will tend to go up from distribution device 20 due to these densities.

As far as the light contaminants are accumulated in the upper part of the body of pressure flocculation reactor 3, they are removed through upper distribution device 18 which is connected to outer pipeline 21 and in case of regular opening of valve 22.

The feedwater flows after passing of middle distribution device coiner 20 downward to lower distribution device 19 and then is removed through outer pipeline 9 to the next treatment stage that is the moving bed pressure filter.

After the feedwater passes pressure flocculation reactor 3 (FIG. 1), it flows through pipeline 9 to moving bed pressure filter 14.

Flocculant solution 11 is added before to pipeline 9 through mixing device 8 by means of pump 10 from flocculant solution tank 11.

In case of severe contamination of the feedwater with mineral oil or other organic substances, there is provided adding of the aqueous solution of powdered activated carbon or other sorbent to pipeline 9 through mixing device 8 by means of pump 12 from sorbent solution tank 13, which is provided before adding of the flocculant solution.

Figure 5:
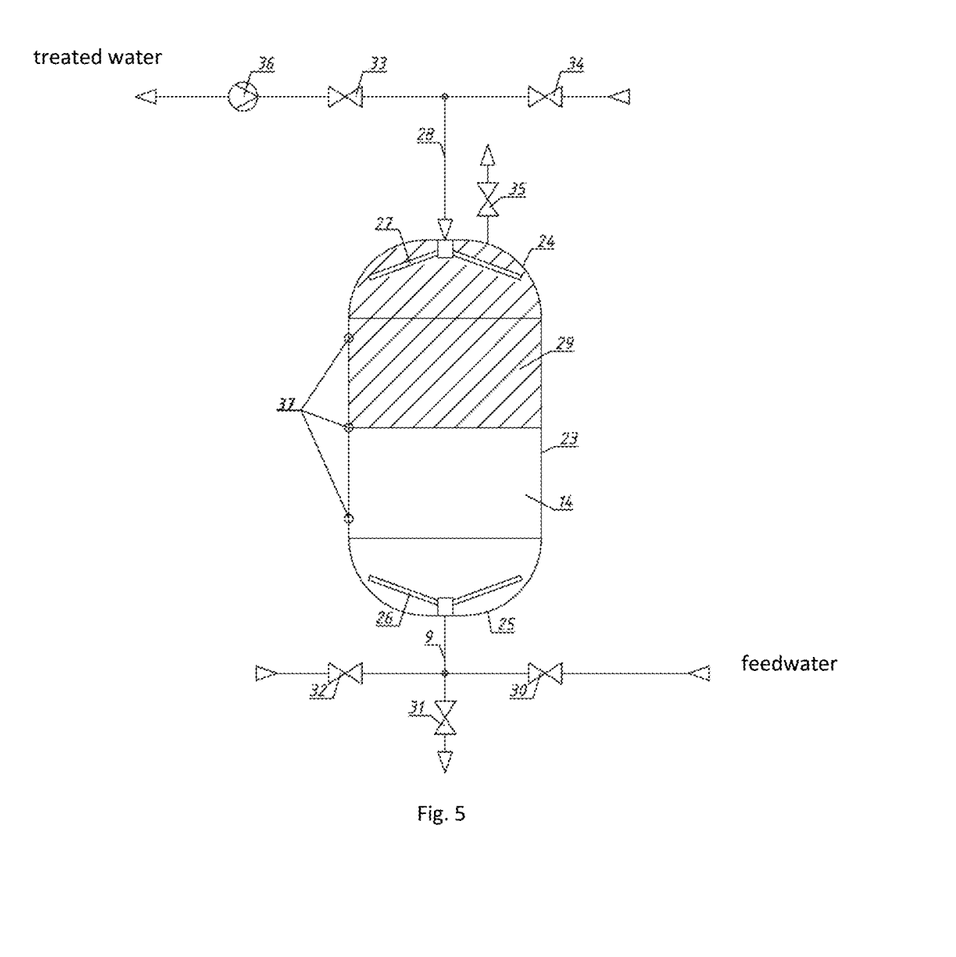
FIG. 5—Moving bed pressure filter.

FIG. 5 shows pressure filter 14 with moving bed 29 consisting of vertical cylindrical body 23 and, respectively, the upper 24 and lower 25 spherical heads. There is lower distribution device 26 in lower sphere 25, which device is connected to pipeline 9 for the supply of the feedwater after passing of the pressure flocculation reactor 3 (FIG. 1).

There is upper distribution device 27 in upper sphere 24, which device is connected to feedwater drainage pipe 28. There is moving bed 29 inside pressure filter 14.

There are respective valves for supply of the feedwater 30, discharge and partial drainage of water flush 31 and supply of compressed air 32 on pipeline 9.

There are respective valves for the removal of feedwater 33 and supply of water flush 34 on pipeline 28. There is an exhaust air-vent device that is valve 35 on the upper sphere 24.

In case of operation of pressure filter 14 with moving bed 29, the feedwater is supplied through open valve 30 to lower distribution device 26, which provides the uniform upflow of the feedwater along the section of pressure filter 14. Next, the feedwater, which has been treated with various chemicals that is oxidizing agent, coagulant, flocculant and a solution of powdered sorbent (FIG. 1), filtered through moving bed 29, on the surface of the grains of which the contaminants will be kept back in the form of micro flocks formed before in pressure flocculation reactor 3 (FIG. 1).

The feedwater is removed out of moving bed 29, through upper distribution device 27 and through pipeline 28 with open valve 33.

As far as moving bed 29 is contaminated, there is a resistance to the process of filtering of the feedwater, which results in decrease of capacity of pressure filter 14. There is provided to perform control of the operability of pressure filter 14 by means of flow meter 36 located on outlet pipeline 28 after valve 33. This location of flow meter 36 is provided to extend its run life. Do not install flow meter 39 on outlet pipeline 9, as the latter will fail because of its contamination with micro flocks of the feedwater.

There is provided additionally to switch off pressure filter 14 for cleaning of moving bed 29 according to a signal of the pressure sensor especially according to pressure drop between inlet 9 and outlet 28 pipelines.

Figure 6:
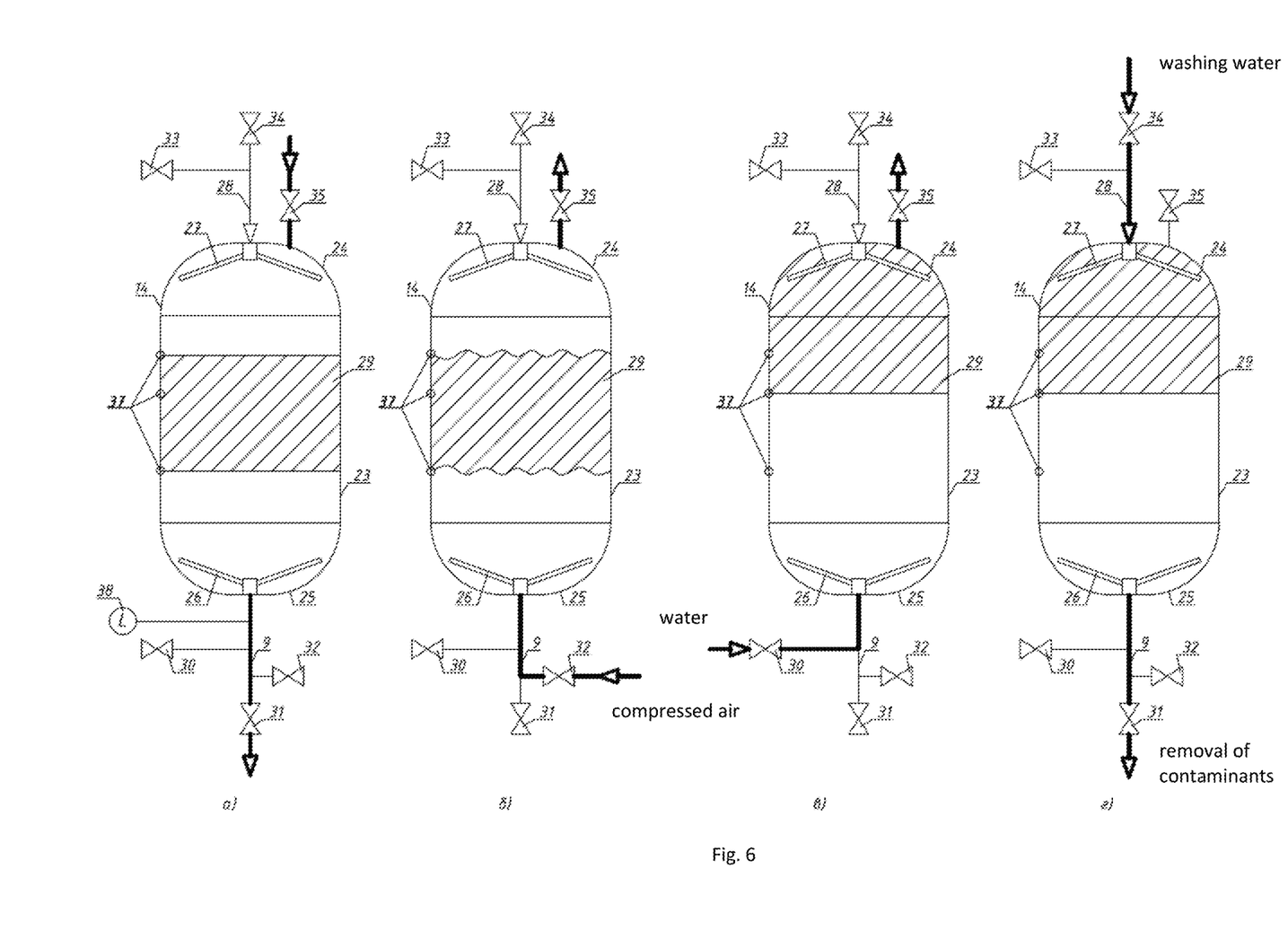
FIG. 6—Method of cleaning of the moving bed of the pressure filter.

FIG. 6 represents a method of cleaning of the moving bed, which is performed within four steps according to the invention.

Partial emptying of pressure filter 14 with moving bed 29 is performed at the first stage (FIG. 6a). If valves 31 and 35 are opened, moving bed 29 goes down due to water discharge out of pressure filter 14.

The partial emptying of filter 14 is completed, if the lower bed 29 is at a distance of 10 cm or more from the lower distribution device 26 and the top moving bed is at a distance of 10 cm or more from upper distribution device 27. Valve 31 is closed after that.

To control the stage of the partial discharge of the water out of pressure filter 14, peep-holes 37 are used, the lower one of which shows bottom moving bed 29 and the upper peep-hole shows the top moving bed 29, in case of the partial discharge. The middle peep-hole shows bottom moving bed 29 during filtering of feedwater (FIG. 5) and during flushing of moving bed 29 with water flush (FIG. 6d).

In case of automation of the process, there is provided to install level parameter 38, which will provide information on completion of the partial emptying of pressure filter 14 with moving bed 29.

Compressed air under pressure 2-10 bar is supplied with open valve 32 to lower distribution device 26 at the second stage (FIG. 6b), after which the upflow of the compressed air destroys "cementation" (clogging) of moving bed 29 and provides random motion of its grains in the water layer resulting in friction of grains and consequently providing intensive removal of the contaminants stuck to the surface of the grains of moving bed 29. The compressed air is vented to the atmosphere through open valve 35.

The compressed is supplied within 3 to 30 minutes, after which valve 32 is closed.

Pressure filter 14 with a moving bed 29 is filled with water at the third stage (FIG. 6c), wherefore valve 30 for supply of the feedwater is opened. In case of the filling of pressure filter 14, moving bed 29 goes up and displaces the air from upper sphere 24, which is removed to the atmosphere through valve 35. If pressure filter 14 is completely filled, moving bed 29 occupies upper sphere 24 and the part of cylindrical body 23 of pressure filter 14. Then, valves 30 and 35 are closed.

The water flush is supplied at the fourth stage (FIG. 6d), which is supplied under pressure through open valve 34, pipeline 28 and upper distribution device 27. Then, the downflow of the water flush flushes the contaminants, which come unstuck from the surface of the grains of moving bed 29 and which are removed under their own weight and under the flow of the water flush from pressure filter 14 through the lower distribution device 26, through pipeline 9 with open valve 31. This operation lasts for 2-20 minute, after which valves 34 and 31 are closed.

When the above stages of the treatment of moving bed 29 are passed, pressure filter 14 with moving bed 29 is put into operation or is on standby.

Figure 7:
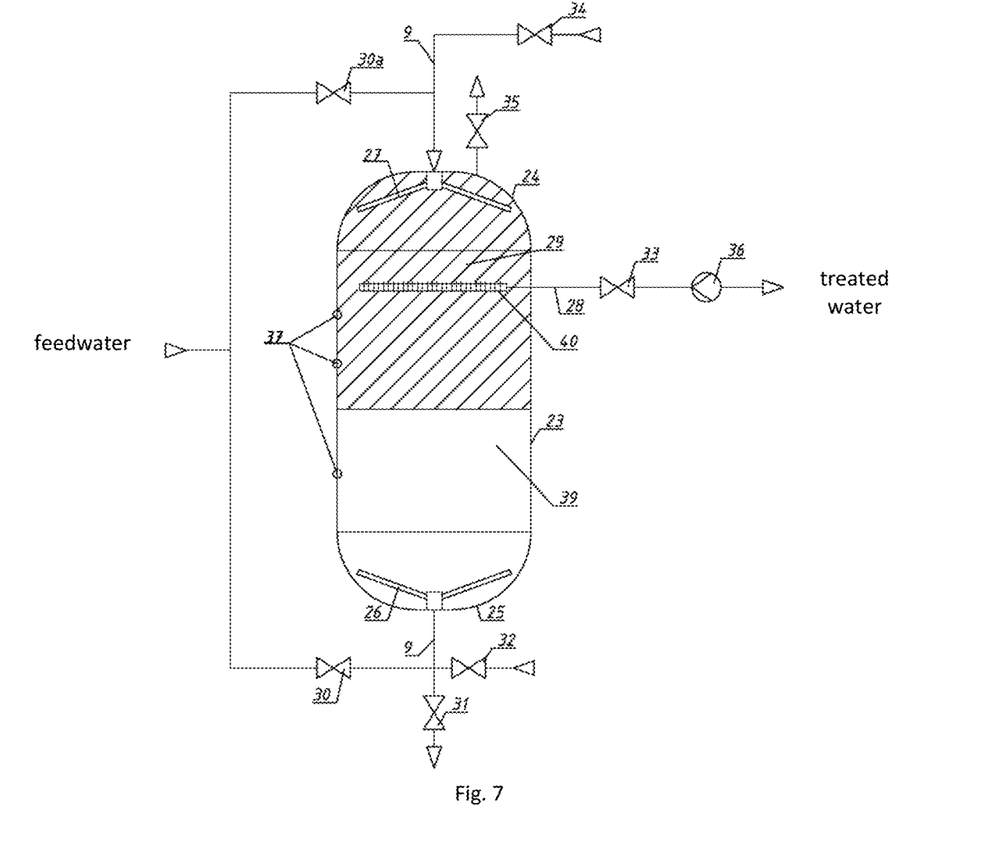
FIG. 7—Double-flow moving bed pressure filter.

To intensify the water treatment process, especially, to increase the capacity of the moving bed filter, there is provided a new device that is a double-flow moving granular bed pressure filter, which is showed in FIG. 7.

Actually, this filter 39 is similar to pressure filter 14 with moving bed 29 (FIG. 5) and consists of vertical cylindrical body 23 and, consequently, upper 24 and lower 25 spherical heads. There is lower distribution device 26 in lower sphere 25, which device is connected to lower pipeline 9 for supply of the feedwater, which passed pressure flocculation reactor 3 (FIG. 1).

There is upper distribution device 27 in upper sphere 24, which device is connected to upper pipeline 9 for supply of the feedwater, which passed pressure flocculation reactor 3 (FIG. 1)

There is moving bed 29 inside the body of double-flow pressure filter 39.

There are respective valves for supply of the feedwater 30, discharge of the water flush and partial drainage 31 and compressed air supply 32 on the lower pipeline 9.

There are relevant valves for supply of the feedwater 30a and supply of the water flush 34 on the upper pipeline 9.

There is an air-vent device that is valve 35 on upper sphere 24.

The treated water is removed from middle distribution device 40, which is located in the middle of moving bed 29. Middle distribution device 40 is connected to pipeline 28 and treated water drain valve 33. There is also flow meter 36 after valve 33 on pipeline 28.

In case of operation of double-flow pressure filter 39 with moving bed 29, the feedwater is supplied through upper and lower pipelines 9 with open valves 30 and 30a to upper 27 and lower 26 distribution devices.

Then the feedwater, which is treated before with various chemicals that is an oxidizing agent, coagulant, flocculant and a powder sorbent solution (FIG. 1), is filtered by upflow and downflow through moving bed 29, on the surface of which the grains will be kept back in the form of micro flocks generated before, in pressure flocculation reactor 3 (FIG. 1).

The treated water is removed out of moving bed 29 through middle distribution device 40 and through pipeline 28 with open valve 33.

As far as moving bed 29 is contaminated, there is a resistance to the process of filtering of the feedwater, which results in decrease of capacity of double-flow pressure filter 39 with moving bed 29. There is provided to perform control of the operability of pressure filter 39 by means of flow meter 36 located on outlet pipeline 28 after valve 33. This location of flow meter 36 is provided to extend its run life. Do not install flow meter 39 on outlet upper and lower pipelines 9, as the latter will fail because of its contamination with micro flocks of the feedwater.

There is provided additionally to switch off double-flow pressure filter 14 for cleaning of moving bed 29 according to a signal of the pressure sensor especially according to pressure drop between inlet 9 and outlet 28 pipelines.

Figure 8:
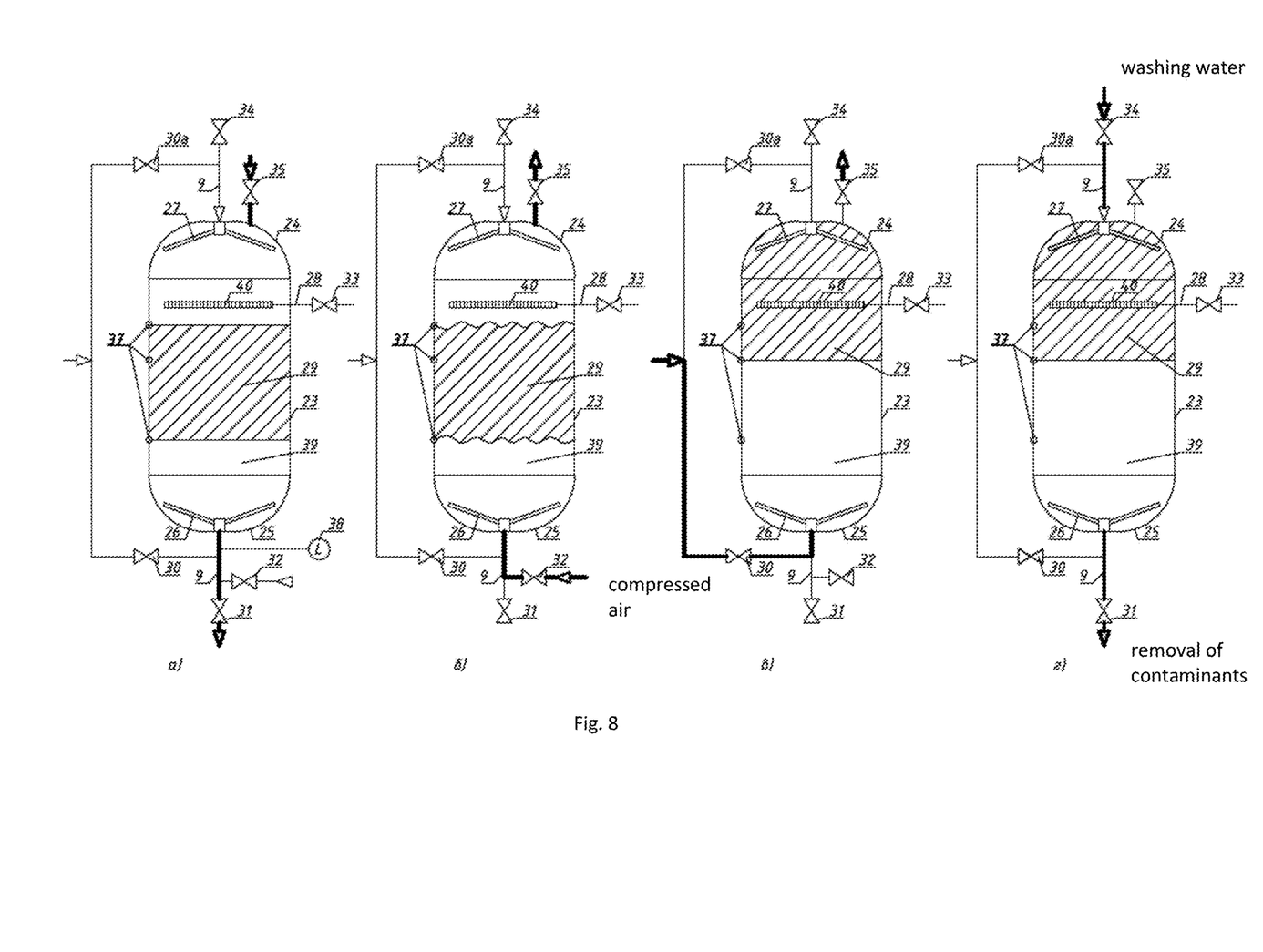
FIG. 8—Method of cleaning of the moving bed of the double-flow pressure filter.

FIG. 8 represents a method of cleaning of the moving bed of the double-flow pressure filter, which is performed within four steps according to the invention.

Partial emptying of double-flow pressure filter 39 with moving bed 29 is performed at the first stage (FIG. 8a) due to opening of valves 31 and 35 and moving bed 29 goes down due to water discharge.

The partial emptying of the filter is completed, if the lower bed 29 is at a distance of 10 cm or more from the lower distribution device 26, as well as when the top moving bed 29 is at a distance of 10 cm or more from middle distribution device 40 that is in the middle between of distribution devices 26 and 40. Valve 31 is closed after that.

To control the stage of the partial discharge of the water peep-holes 37 are used, the lower one of which shows bottom moving bed 29 and the upper peep-hole shows the top moving bed 29, in case of the partial discharge. The middle peep-hole shows bottom moving bed 29 during filtering of feedwater (FIG. 7) and during flushing of moving bed 29 with water flush (FIG. 8d).

In case of automation of the process, there is provided to install level parameter 38, which will provide information on completion of the partial emptying of double-flow pressure filter 39 with moving bed 40.

Compressed air under pressure 2-10 bar is supplied with open valve 32 to lower distribution device 26 at the second stage (FIG. 8b), after which the upflow of the compressed air destroys "cementation" (clogging) of moving bed 29 and provides random motion of its grains in the water layer resulting in friction of grains and consequently providing intensive removal of the contaminants stuck to the surface of the grains of moving bed 29. The compressed air is vented to the atmosphere through open valve 35.

The compressed is supplied within 3 to 30 minutes, after which valve 32 is closed.

The double-flow pressure filter 39 with moving bed 29 is filled with water at the third stage (FIG. 8d), for which valve 30 is opened for supply of the feedwater through lower pipe 9 and lower distribution device 26. In case of supply of the feedwater by upflow, moving bed 29 goes up and displaces air from the upper part of the vertical cylindrical body 23 and from upper sphere 24, which is removed to the atmosphere through valve 35.

When double-flow pressure filter 39 is completely filled with water, moving bed 29 occupies upper sphere 24 and the upper part of cylindrical body 23 and then valves 30 and 35 are closed.

Moving bed 29 is cleaned at the fourth stage (FIG. 8d) with the water flush, which is supplied under pressure through open valve 34, and then through upper distribution device 27. Then, the downflow of the water flush flushes the contaminants, which come unstuck from the surface of the grains of moving bed 29 and which are removed under their own weight and under the flow of the water flush through the lower distribution device 26, through pipeline 9 and through open valve 31. This operation lasts for 2-20 minute, after which valves 34 and 31 are closed. When the above stages of the treatment of moving bed 29 are passed, double-flow pressure filter 39 with moving bed 29 is put into operation or is on standby.

Figure 9:
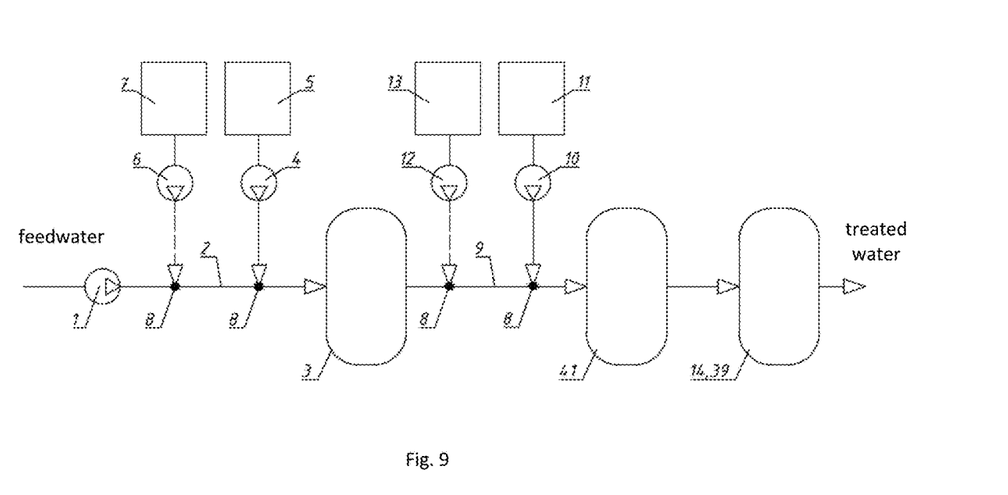
FIG. 9—Option of treatment of the feedwater with the use of the pressure filter including double-flow moving bed pressure filter (Option 2).

The FIG. 9 shows an option for treatment of the feedwater with the use of the pressure filter including the double-flow moving bed pressure filter. Option 2.

This option differs from Option 1 (FIG. 1) by the fact that second stage pressure flocculation reactor 41 is installed after pressure flocculation reactor 3 in front of pressure filter 14 or before double-flow moving bed pressure filter 39.

This solution ensures highly effective generation of micro flocks of the contaminants in the feedwater and also ensures reduction of consumption of the chemicals for the treatment of the feedwater, which will result in lower operating costs.

The second-stage pressure flocculation reactor can be represented with regard to design in three modifications showed in FIGS. 2, 3, 4.

The difference of the second stage pressure flocculation reactor is lesser time of keeping of the feedwater in this second stage reactor, which is 1-10 minutes depending on the degree of contamination of the feedwater and its temperature.

After the feedwater passes second stage pressure flocculation reactor 41, it flows to moving bed pressure filter 14 or to double-flow pressure filter 39. The modifications of the pressure filter including double-flow moving bed pressure filter and methods of cleaning of the moving bed are showed above in FIG. 5, FIG. 6, FIG. 7, FIG. 8.

Figure 10:
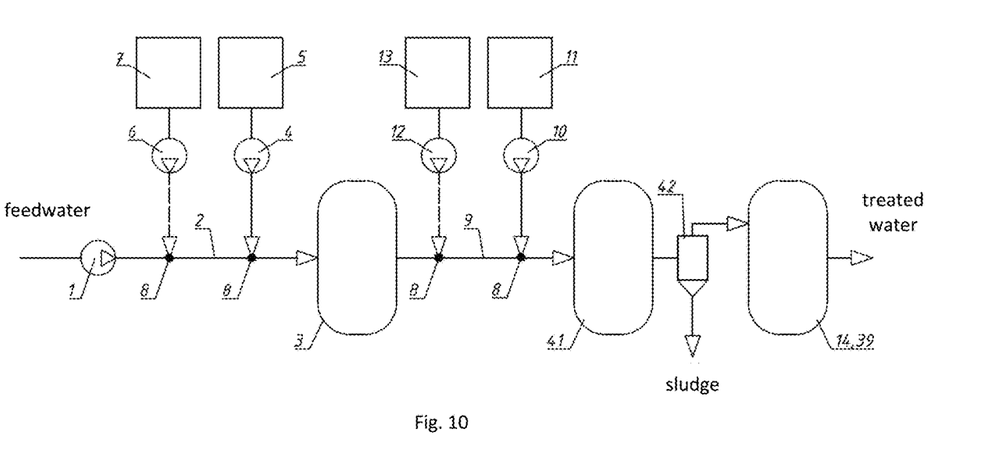
FIG. 10—Option of treatment of the feedwater with the use of the filter, including double-flow moving bed pressure filter (Option 3)

FIG. 10 shows an option for treatment of the feedwater with the use of the pressure filter including the double-flow moving bed pressure filter. Option 3.

This option differs from Option 2 showed in FIG. 9 by the fact that pressure hydrocyclone 42 of known designs is installed after the second stage pressure flocculation reactor 41 in front of pressure filter 14 or in front of double-flow moving bed pressure filter 39. This solution enables removal of the most severe contamination in the feedwater including coagulating heavy impurities through the lower conical device of pressure hydrocyclone 42, consequently resulting in decrease of the amount of the contaminants penetrating pressure filter or double-flow moving bed pressure filter 39, which results in extension of time between cleanings of the moving bed.

The number of pressure flocculation reactors, pressure hydrocyclones and moving bed pressure filters for various modifications of the water treatment plants showed in FIG. 1, FIG. 9 and FIG. 10 is selected depending on the capacity of the plant, the dimensions and volume of the equipment, the amount of the equipment, which is operated, flushed or on standby.

This invention is explained by the following examples.

EXAMPLE 1

In case of treatment of the water of the reservoir to produce drinking water in the amount of 80 $m^3/h$, the following successive stages of the water treatment at the treatment plant are used:
- adding of the coagulant solution (aluminum sulfate) to the pressure pipe of the feedwater;
- supply of the flocculated water to the vertical pressure flocculation reactor (PFR) with a diameter of 2.0 meters and height of 3.0 meters in the downflow and the time of keeping of water in it for 7 minutes;
- adding of the flocculant solution (Seurvey) to the pipeline after the PFR;
- supply of the feedwater treated with chemicals in the upflow to the moving bed pressure filter (MBPF) with a diameter of 2.6 meters. In this case, there are two MBPF filters, one of which is in operation, and the second one is under the conditions of cleaning of the moving bed or is on standby;
- disinfection of the treated water by adding of the sodium hypochlorite to it, and then supply of the treated water for domestic needs as drinking water.

The moving bed is contaminated during the operation of the MBPF, therefore, it was cleaned once a day due to the preliminary supply of the upflow of the compressed air, and then the downflow of the water flush for 15 minutes at a flow rate of 150 $m^3/h$.

The capacity of the water treatment plant decreased from 80 $m^3/h$ to 30 $m^3/h$ in a month of operation of the plant. The moving bed was inspected and it has been found that 30% of its volume were "cemented" (clogging). The repeated cleanings of the moving bed did not provide an increase of the plant capacity.

It was proposed to clean the moving bed within four stages, namely, partial emptying of the moving bed, then supply of the upflow of the compressed air, filling of the pressure filter with water and then flushing with water in the downflow (FIG. 6.) As a result of passing of these stages the moving bed was completely cleaned and the plant provided rated capacity of 80 $m^3/h$.

There were also problems in meeting standard target parameters of SanPiN "Drinking Water" in winter and during summer flowering of the reservoir, which are showed in Table 1.

TABLE 1

| Parameter name | Winter season | | Summer period "Flowering" of the reservoir | | SanPiN requirement "Drinking water" |
|---|---|---|---|---|---|
| | Feedwater | Treated water | Feedwater | Treated water | |
| Turbidity, mg/dm$^3$ | 10-20 | 1.5-2.2 | 15-35 | 1.5-3.0 | 1.5 |
| Iron, mg/dm$^3$ | 0.6-0.8 | 0.28-0.41 | 0.8-1.2 | 0.3-0.5 | 0.3 |
| Color grade | 50-60 | 18-28 | 110-180 | 20-30 | 20 |
| Permanganate index, mgO/dm$^3$ | 8-11 | 4.8-6.2 | 12-18 | 6-8 | 5.0 |
| Water temperature, ° C. | 3-5 | 3-5 | 18-20 | 18-20 | — |

To improve the flocculation process, the downflow in the PFR was changed to upflow, which made it possible to improve the flocculation process at the low temperature of the feedwater (3-5° C.) due to the micro flocks generated before, which are suspended in the PFR and are a catalyst for their enlargement.

Added to this is the fact that an oxidizing agent (sodium hypochlorite) was added to the feedwater before adding of the coagulant in the summer period, which ensured the oxidation of organic iron complexes during flowering of the reservoir and improved the flocculation process.

The quality of the feedwater and the treated water after taking of these measures is showed in Table 2.

TABLE 2

| Parameter name | Winter season | | Summer period "Flowering" | | SanPiN requirement "Drinking water" |
|---|---|---|---|---|---|
| | Feedwater | Treated water | Feedwater | Treated water | |
| Turbidity, mg/dm$^3$ | 10-20 | Less than 1.5 | 15-35 | Less than 1.5 | 1.5 |
| Iron, mg/dm$^3$ | 0.6-0.8 | 0.1-0.2 | 0.8-1.2 | 0.1-0.15 | 0.3 |
| Color grade | 50-60 | 10-20 | 110-180 | 8-15 | 20 |
| Permanganate index, mgO/dm$^3$ | 8-11 | 3.8-4.8 | 12-18 | 3.0-4.2 | 5.0 |
| Water temperature, ° C. | 3-5 | 3-5 | 18-20 | 18-20 | — |

EXAMPLE 2

In case of treatment of industrial waste water containing 20-50 mg/dm$^3$ of petroleum hydrocarbons and a capacity of 200 m$^3$/h, the following successive stages of water treatment are used to supply the feedwater to circulating water cycles of the oil refinery:
  adding of the coagulant solution (polyoxychloride aluminum) to the pressure pipeline and waste water pipeline;
  supply of the flocculated water in the downflow to vertical pressure flocculation reactors (PFR) in the amount of 2 pcs., with a diameter of 3.0 meters and height of 3.0 meters each, the time of keeping of the water in them is 13 minutes;
  adding of the flocculant solution (Seurvey) to the pipeline after PFR;
  supply of treated waste water in the upflow to moving bed pressure filters (MBPF) in the amount of 3 pcs., with a diameter of 3.0 meters and height of 3 meters each. In this case, two MBPFs are under the conditions of cleaning and the third MBPF is under the conditions of cleaning of the moving bed or on standby.
  disinfection of the treated water by adding of the sodium hypochlorite to it and then the treated water is supplied to feed the circulating water cycles.

The problem of low quality of the treated water because of remaining petroleum hydrocarbons was faced during the operation of the MBPF.

The quality of the waste water and treated water, as well as the requirements for make-up water of circulating water cycles are given in Table 3.

TABLE 3

| Parameter name | Waste water | Treated water | Standards for make-up water in circulating water cycles |
|---|---|---|---|
| Content of suspended solids, mg/dm$^3$ | 20-30 | Less than 5 | Less than 5 |
| Content of petroleum hydrocarbons, mg/dm$^3$ | 20-50 | 8-15 | Less than 5 |
| Water temperature, ° C. | 18-25 | 18-25 | No more than 30 |

To improve the removal of petroleum hydrocarbons in the process of the waste water treatment, an additional middle distribution device was provided in the PFR, which is located in the middle of the PFR. Also, after the coagulant was added, a demulsifier based on surfactants was added before passing of the PFR.

As a result, after the waste water is treated with a coagulant and demulsifier, it flows to the middle distribution device of the PFR, after passing of which petroleum hydrocarbons go up to the upper part of the PFR and are removed from the PFR through the upper distribution device (FIG. 4), and the main flow with low content of petroleum hydrocarbons (8-15 mg/dm$^3$) goes downward out of the PFR through the lower distribution device.

The flocculant is added to the treated waste water after passing of the PFR, which then flows to the MBPF.

As a result of this resolution, the waste water treatment was provided at the MBPF and the content of petroleum hydrocarbons in the treated water was less than 5 mg/dm$^3$.

EXAMPLE 3

In case of treatment of mining waste water with a high content of suspended solids (500-1500 mg/dm$^3$), which mainly consist of coal dust, the following stages are used to treat this waste water with a capacity of 1000 m$^3$/h to meet the standards of surface impoundment:
  adding of the coagulant solution (polyoxychloride aluminum) to the waste water pressure pipeline;
  supply of the flocculated water in the downflow to vertical pressure flocculation reactors (PFR) in the amount of 5 pcs., with a diameter of 3.4 meters and height of 4.5 meters each, the time of keeping of the water in them is 12 minutes;
  adding of the flocculant solution (Seurvey) to the pressure pipeline after the PFR;

supply of the treated waste water in the upflow to the moving bed pressure filters (MBPF) in the amount of 8 pcs., with a diameter of 3.4 meters and height of 3.0 meters each. In this case, seven MBPF filters are under the conditions of cleaning and the eighth MBPF is under the conditions of cleaning of the moving bed or is on standby. Polymer grains with grain composition of 5-8 mm and a density of 0.9 g/cm$^3$ are used as a moving bed the height of the moving bed is 2.0 meters;

disinfection of the treated water by adding of the sodium hypochlorite to it followed by surface impoundment (river).

The high quality of the treated water was assured in accordance with all standard parameters during the operation of this plant for treatment of the mining water.

The only problem is a short cycle of the water treatment (filter cycle) at each MBPF between the cleanings of the moving bed (less than two hours), and the amount of the waste water flush was up to 30% of the plant capacity.

The quality of the mining waste water, treated water and the requirements for the discharge of the treated water are given in Table 4.

TABLE 4

| Parameter name | Mining waste water | Treated water | Treated water standards before surface impoundment |
|---|---|---|---|
| Content of suspended solids, mg/dm$^3$ | 500-1500 | less than 3.0 | 3.0 |
| Aluminum, mg/dm$^3$ | 0.1-0.3 | less than 0.04 | 0.04 |
| Total biological oxygen demand, mgO$_2$/dm$^3$ | 5-8 | less than 3.0 | 3.0 |
| Content of petroleum hydrocarbons, mg/dm$^3$ | 0.1-0.25 | less than 0.05 | 0.05 |
| Phosphates, mg/dm$^3$ | 0.1-0.2 | less than 0.1 | 0.1 |
| Manganese, mg/dm$^3$ | 0.1-0.4 | less than 0.1 | 0.1 |
| Iron, mg/dm$^3$ | 0.7-1.6 | less than 0.1 | 0.1 |

To solve the above problem, two vertical second stage pressure flocculation reactors (second stage PFR) with a diameter of 3.4 meters and height of 4.5 meters each were installed, to which the water treated with the flocculant is supplied after passing of the PFR, in order to enlarge the flocculated flocks of suspended substances.

After the water passes the second stage PFR, it is supplied to two newly installed pressure hydrocyclones with a diameter of 0.8 meters each, through the lower conical device of which flocculated contaminants (suspended solids) are removed.

Partially clarified water with a residual content of suspended solids of 10-30 mg/dm$^3$ flows upward after passing of the hydrocyclones to the existing MBPF (8 pcs), after passing of which the treated water complies with the surface impoundment requirement. In this case, the time of water treatment (filter cycle) for each MBPF between the cleanings of the moving bed increased from 1.5-2 hours to 23-28 hours, and the amount of waste water flush decreased from 30% to 2-3% of the plant capacity ensuring high effective operation of the mining waste water treatment plant.

EXAMPLE 4

To increase the contaminant capacity of the moving bed (the amount of water contaminants kept back by a certain volume of the moving bed), as well as to improve the treatment, comparative laboratory tests of a single bed and a double bed were performed.

The following successive stages of the treatment of the feedwater at the laboratory-scale plant were used for the tests:

adding of the coagulant to the pressure pipeline of the feedwater;

supply of the flocculated water in the downflow to the vertical pressure flocculation reactor (PFR) with a diameter of 0.2 meters and height of 2.0 meters, the time of keeping of water in the PFR is 13 minutes;

a flocculant is added to the feedwater after passing of the PFR, and then it flows to the moving bed pressure filter (MBPF) with a diameter of 0.2 meters and height of 2.5 meters;

the feedwater is removed from the MBPF through the upper distribution device.

The flow rate through the laboratory-scale plant was kept within the range of 300-400 l/h.

Two series of tests were performed. Polymer grains with grain composition of 3-5 mm and density of 0.9 g/cm$^3$ were used as a moving bed in the first series of the tests. The height of the moving bed was 1.8 meters.

A double moving bed was used in the second series of tests, the top bed consisted of polymer grains with a size of 2-3 mm and density of 0.7 g/cm$^3$, and the bottom bed consisted of polymer grains with a size of 5-7 mm and density of 0.9 g/cm$^3$. The total height of the double bed made also 1.8 meters, of which 0.9 meters were the top bed and 0.9 meters were the bottom bed.

The quality of the feedwater and treated water, as well as the amount of the treated water between cleanings of the moving bed (filter cycle) according to the series of the performed tests is given in Table 5.

Five filter cycles were completed in each test series for unbiased assessment of similar conditions for adding of the chemicals (coagulant, flocculant). The MBPF was switched off for cleaning at a pressure drop of more than 1 bar that is upstream/downstream pressure difference.

TABLE 5

| Parameter name | Feedwater | Treated water of the first test series | Treated water of the second test series |
|---|---|---|---|
| Suspended substances, mg/dm$^3$ | 20-25 | 1-2 | less than 1.0 |
| Iron, mg/dm$^3$ | 0.7-0.8 | 0.1-0.15 | less than 0.1 |
| Color grade | 110-120 | 17-20 | 11-14 |
| Permanganate index, mgO/dm$^3$ | 8.2-9.1 | 3.7-4.2 | 2.9-3.3 |
| Phosphates, mg/dm$^3$ | 0.4-0.45 | 0.05-0.1 | less than 0.05 |
| Petroleum hydrocarbons, mg/dm$^3$ | 0.2-0.23 | 0.09-0.11 | 0.05-0.07 |
| Amount of feedwater per filter cycle, m$^3$ | — | 13-1.9 | 13.2-13.8 |

The results of Table 5 allow of the conclusion that the double moving bed provides more effective treatment of the feedwater and also makes it possible to increase the amount of the treated water almost twofold compared to the single moving bed.

It can be explained by the fact that the bottom bed of the double bed provides high contaminant capacity due to large grains (5-7 mm), and the top bed assures high quality of the treated water due to small grains (2-3 mm) The grain size is 3-5 mm in the top bed.

EXAMPLE 5

To intensify filtration through the moving bed pressure filter, that is, to increase its capacity at the laboratory plant showed in Example 4, two series of laboratory tests were also performed.

The first series of the tests were performed in the same way as the first series of tests in Example 4.

The difference of the second series of the tests was that an MBPF with a diameter of 0.2 meters was used, but its height was increased to 3.5 meters instead of 2.5 meters. An additional middle distribution device was installed at a height of 0.9 meters from the upper distribution device in the MBPF. Polymer grains with a size of 3-5 mm and density of 0.9 g/cm³ were used as a moving bed in the first and second series of the tests and the height of the moving bed was 1.8 meters.

Five filter cycles were completed in each series of the tests for unbiased assessment. The MBPF was switched off to clean the moving bed at pressure difference more than 1.0 bar that is upstream/downstream pressure difference.

The results of two series of the laboratory tests are given in Table 6 that is the quality of the feedwater and treated water, the filter cycles between cleanings of the moving bed of the MBPF, as well as the nominal and maximal capacity of the MBPF.

TABLE 6

| Parameter name | Feedwater | Treated water of the first test series | Treated water of the second test series |
|---|---|---|---|
| Suspended substances, mg/dm³ | 20-25 | 1-2 | 1-2 |
| Iron, mg/dm³ | 0.7-0.8 | 0.1-0.15 | 0.1-0.15 |
| Color grade | 110-120 | 17-20 | 17-20 |
| Permanganate index, mgO/dm³ | 8.2-9.1 | 3.7-4.2 | 3.7-4.2 |
| Phosphates, mg/dm³ | 0.4-0.45 | 0.05-0.1 | 0.05-0.1 |
| Petroleum hydrocarbons, mg/dm³ | 0.2-0.23 | 0.09-0.11 | 0.09-0.11 |
| Amount of the treated water, m³ | — | 7.3-7.9 | 14.1-15.3 |
| Nominal capacity, 1/h | — | 350 | 700 |
| Maximal capacity, 1/h | — | 500 | 1000 |
| Amount of water flush, 1 | — | 140-160 | 140-160 |
| Percentage of water flush of the amount of treated water, % | — | 1.9-2.0 | 0.5-1 |

The comparative results of the laboratory tests allow of the following conclusions on the advantage of the double-flow MBPF over the single-flow MBPF:
- the quality of the treated water is the same;
- the capacity doubled;
- the amount of the treated water (filter cycle) increased by a factor of two;
- the amount of the water flush during the cleaning of the moving bed is the same, but in terms of the amount of the treated water decreased by a factor of two.

The invention claimed is:

1. A method for treating a feedwater comprising natural water or waste water, the method including the following treatment stages:
    adding an oxidizing agent to the feedwater,
    mixing of the feedwater with a coagulant,
    flocculation of the feedwater in a pressure flocculation reactor made in the form of a vertical vessel during 2 and up to 30 minutes,
    adding a flocculant to the feedwater after the flocculation in the pressure flocculation reactor,
    filtering the feedwater through a moving granular bed in a moving granular bed pressure clarifying filter to produce a filtered water, and
    disinfection of the filtered water with sodium hypochlorite,
    wherein the moving granular bed in the moving granular bed pressure clarifying filter has a single layer or two layers of polymer granules with a granule size in a range of 1-20 mm and a density of granules in a range of 0.3-0.98 g/cm³, and a height of the moving granular bed is in a range 0.5-2.5 m,
    wherein the feedwater with a temperature above 10° C. flows downward through the pressure flocculation reactor,
    wherein the feedwater with a temperature below 10° C., as well as low turbid and deep color water flow upward through the pressure flocculation reactor,
    wherein a demulsifier is additionally added to the flow of the feedwater, which contains light contaminants with a density less than the density of water, and then the feedwater flows to the middle of the pressure flocculation reactor and then downward through the pressure flocculation reactor, and light contaminants are removed from the feedwater by upward flow.

2. The method according to claim 1, wherein the feedwater flows to the moving granular bed pressure clarifying filter in two directions that are upward and downward for getting filtered through the polymer granules of the moving granular bed by downflow and upflow, the filtered water is drained through the middle of the moving granular bed pressure clarifying filter, and the height of the moving granular bed is in a range of 1.0-3.5 m, wherein the granule size of the polymer granules is in a range of 3-10 mm.

3. The method according to claim 1, wherein before the flocculant is added, an additional sorbent, which is a powder sorbent solution, is added.

4. The method according to claim 1, wherein high-pressure or low-pressure polyethylene, polypropylene, composite materials based on polyethylene, polypropylene or their analogues are used as a material for the moving granular bed.

5. The method according to claim 1, wherein the polymer granules have a smooth surface and small inclusions, wherein a total volume of the small inclusions is not more than 10% of the volume of the polymer granules, and wherein the polymer granules have the form of a sphere, hemisphere, cylinder, or cubic shape.

6. The method according to claim 1, wherein before the filtering, a flocculation of the feedwater in a second stage flocculation reactor is carried out.

7. The method according to claim 6, wherein after the flocculation of the feedwater in the second stage flocculation reactor, heavy contaminants are removed from the feedwater, including coagulated heavy impurities in a pressurized hydrocyclone.

8. The method according to claim 1, wherein a flow of the filtered water at an outlet of the moving granular bed pressure clarifying filter is measured.

9. The method according to claim 1, wherein the filtering is carried out in the moving granular bed pressure clarifying filter in an upward flow through the moving granular bed having the single layer of polymer granules with the granule size in range of 3-10 mm, and wherein the height of the moving granular bed is in a range of 0.5-2.3 m.

10. The method according to claim 1, wherein the filtering is carried out in the moving granular bed pressure clarifying filter in an upward flow through the moving granular bed having the two layers of polymer granules comprising a lower layer and an upper layer, wherein polymer granules with a density in the range of 0.3-0.8 g/cm$^3$ and a granule size of 1-5 mm are used as the upper layer, and polymer granules with a density of 0.8-0.98 g/cm$^3$ with a granule size of 3-20 mm are used as the lower layer, so that a total height of the two layers of the moving granular bed is 1.0-2.5 m, wherein a height of the upper layer is 0.3-1.5 m, and wherein a height of the lower layer is 0.5-1.5 m.

11. The method according to claim 1, wherein flushing of the moving granular bed from the contaminants kept back is performed by partial emptying of the moving granular bed pressure clarifying filter with upper and lower distribution devices so that the moving granular bed goes down and is located in a middle of the moving granular bed pressure clarifying filter and provides a distance between a lower boundary of the moving granular bed to a lower distribution device of more than 10 cm, as well as a distance between an upper boundary of the moving granular bed and the upper distribution device is also more than 10 cm, then compressed air with a pressure of 2-10 bar is supplied for 3-30 min through the lower distribution device and then the moving granular bed pressure clarifying filter is filled with a water flush by an upward flow or downward flow, the water flush is supplied downward for 2-20 minutes after the filling of the moving granular bed pressure clarifying filter with the water flush, and the water flush is drained through the lower distribution device of the moving granular bed pressure clarifying filter.

12. The method according to claim 11, wherein the flushing is controlled by measuring a level of the moving granular bed in the moving granular bed pressure clarifying filter.

13. The method according to claim 2, wherein flushing of the moving granular bed from the contaminants kept back is performed by partial emptying of the moving granular bed pressure filter with upper, lower and middle distribution devices so that the moving granular bed is lowered and provides the distance between a lower boundary of the moving granular bed to the lower distribution device of more than 10 cm, as well as a distance between an upper boundary of the moving granular bed and the middle distribution device that is also more than 10 cm, then compressed air with a pressure of 2-10 bar is supplied for 3-30 min through the lower distribution device and then the moving granular bed pressure clarifying filter is filled with a water flush by an upward or downward flow, the water flush is supplied downward for 2-20 minutes after the filling of the moving granular bed pressure clarifying filter with the water flush, and the water flush is drained through the lower distribution device of the moving granular bed pressure clarifying filter.

14. The method according to claim 13, wherein the flushing is controlled by measuring a level of the moving granular bed in the moving granular bed pressure clarifying filter.

* * * * *